United States Patent
Park et al.

(10) Patent No.: US 7,929,502 B2
(45) Date of Patent: Apr. 19, 2011

(54) RESOURCE ALLOCATION METHOD AND BASE STATION FOR REDUCING UPLINK FEEDBACK OVERHEAD IN A WIRELESS COMMUNICATION SYSTEM

(75) Inventors: Chi-Hyun Park, Suwon-si (KR); Jin-Ghoo Choi, Seoul (KR); Jong-In Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/322,597

(22) Filed: Feb. 4, 2009

(65) Prior Publication Data

US 2009/0213817 A1 Aug. 27, 2009

(30) Foreign Application Priority Data

Feb. 4, 2008 (KR) ........................ 10-2008-0011178

(51) Int. Cl.
*H04W 72/12* (2009.01)
(52) U.S. Cl. ...................................................... 370/336
(58) Field of Classification Search .................. 370/328, 370/336
See application file for complete search history.

(56) References Cited

U.S. PATENT DOCUMENTS

| 7,729,319 B2 * | 6/2010 | Hirano | 370/336 |
| 2009/0201856 A1 * | 8/2009 | Hayashi et al. | 370/328 |
| 2009/0213817 A1 * | 8/2009 | Park et al. | 370/336 |

* cited by examiner

*Primary Examiner* — William D Cumming (57) ABSTRACT

A method and apparatus for reducing an uplink feedback overhead in a wireless communication system includes scheduling DownLink traffic. The method includes determining a transmission period, and allocating UpLink feedback resources considering the DL traffic transmission period.

20 Claims, 9 Drawing Sheets

RESOURCE ALLOCATION METHOD AND BASE STATION FOR REDUCING UPLINK FEEDBACK OVERHEAD IN A WIRELESS COMMUNICATION SYSTEM

CROSS-REFERENCE TO RELATED APPLICATION(S) AND CLAIM OF PRIORITY

The present application claims priority under 35 U.S.C. §119(a) to a Korean Patent Application filed in the Korean Intellectual Property Office on Feb. 4, 2008 and assigned Serial No. 10-2008-0011178, the contents of which are herein incorporated by reference.

TECHNICAL FIELD OF THE INVENTION

The present invention relates generally to an uplink feedback in a wireless communication system. More particularly, the present invention relates to a resource allocation method and apparatus for reducing an uplink feedback overhead in a wireless communication system.

BACKGROUND OF THE INVENTION

In a wireless communication system, a Base Station (BS) allocates UpLink (UL) resources for receiving channel information of a Mobile Station (MS) for the purpose of DownLink (DL) resource allocation. At this time, the kind and period of channel measurement information to have to be reported to UL are determined according to MS's channel state and variation, etc.

Figure 1:
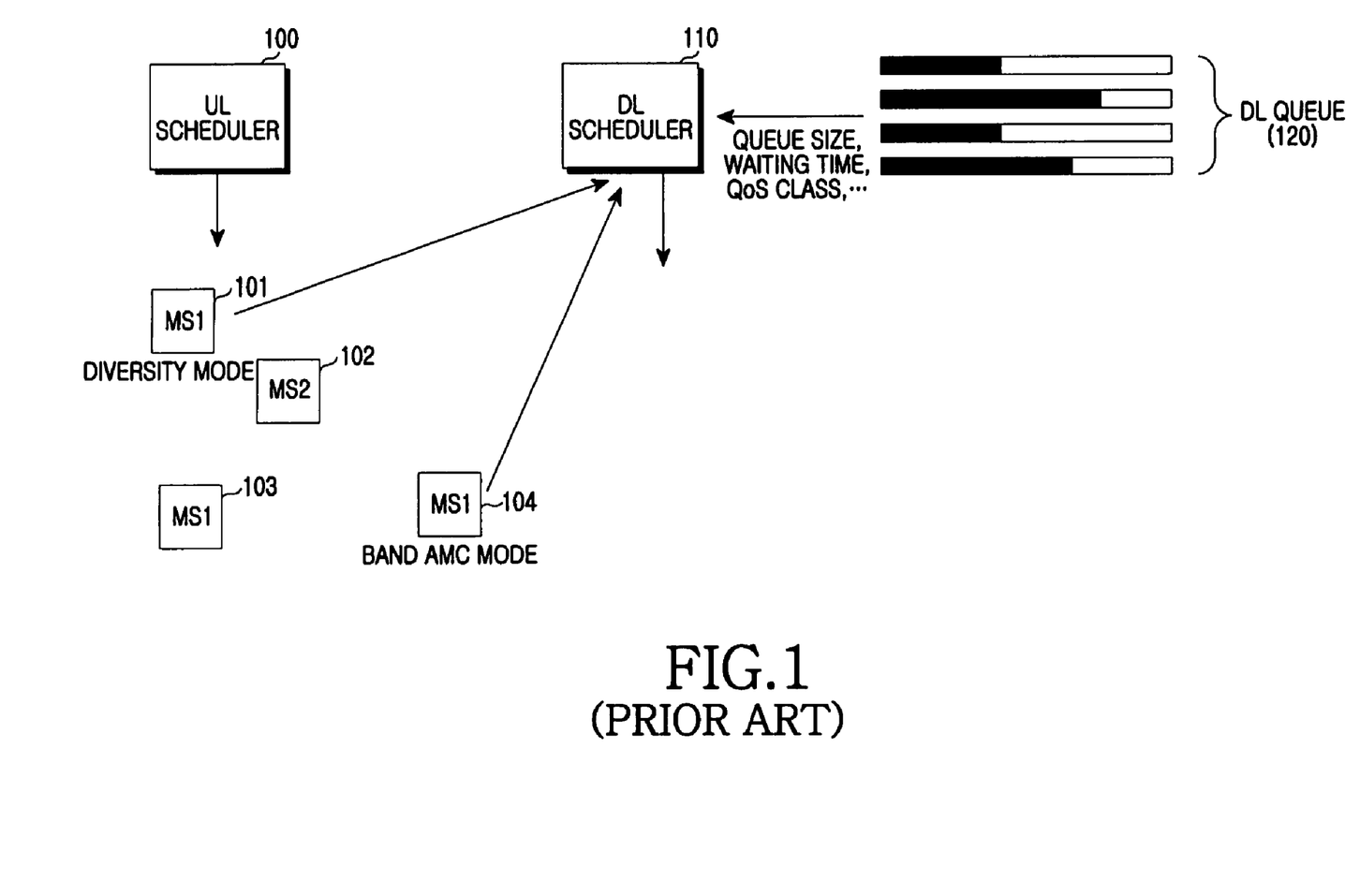
FIG. 1 is a diagram illustrating a scheduling architecture within a base station according to the conventional art.

FIG. 1 is a diagram illustrating a scheduling architecture within a BS according to the conventional art.

Referring to FIG. 1, an UpLink (UL) scheduler 100 and a DownLink (DL) scheduler 110 operate within the BS.

The UL scheduler 100 allocates UL resources according to a DL channel state reported by each MS. Also, the UL scheduler 100 may change a feedback type, an allocation interval or period, etc. according to a DL channel state of an MS.

The DL scheduler 110 selects a user MS using channel state information from each of MSs and allocates DL resources to the selected MS. The DL scheduler 110 receives a queue size, a waiting time, Quality of Service (QoS) class information from a DL traffic queue 120 and selects the user MS according to predefined scheduling algorithm. The data traffics 120 each queues according to a service type.

A BS determines diversity and band Adaptive Modulation and Coding (AMC) modes and a Modulation and Coding Scheme (MCS) level using feedback information of an MS, and informs the MS of the result. Meantime, the MS can transmit a codebook index together so as to obtain a Multi Input Multi Output (IMO) transmission gain, and the BS may determine an MCS level using this information. For example, the DL scheduler 110 receives channel information from MSs 101 to 104 and then selects user MSs 101 and 104 by predefined scheduling algorithm. The user MS 101 operates in the diversity transmission mode, and the user MS 104 operates in the band AMC transmission mode.

However, a scheme of determining a UL feedback type and period based on an MS's channel state acts as an overhead according to the frequency of generation of DL traffic allocated to an MS. But, although resource allocation timing of the BS for the MS is most affected by a traffic generation distribution, a feedback of channel state information is implemented by periods.

In addition, if the MS 104 is in a band AMC resource allocation mode, the BS receives a channel feedback for each of at least one or more candidate bands requested by the MS 104, and allocates resources to a specific band among the candidate bands. That is, an MS requesting for band AMC allocation has to transmit a channel state feedback by band and a codebook index at all times at a predetermined period in order to receive traffic.

However, in many cases, in an Internet-based non-real time service, traffic having to be transmitted to DL is generated as a burst, and a requirement for transmission delay time is not strict.

As described above, in actual, DL resource allocation is implemented at traffic generation timing for a user MS. That is, only at an interval for which resources are allocated while the user MS is in service connection, a feedback is needed. However, in the conventional art, an MS feeds back channel state information by periods during connection setup with no consideration of traffic generation timing, thus causing an overhead.

SUMMARY OF THE INVENTION

To address the above-discussed deficiencies of the prior art, it is a primary aspect of the present invention to substantially solve at least the above problems and/or disadvantages and to provide at least the advantages below. Accordingly, one aspect of the present invention is to provide a method and apparatus for reducing an UL feedback overhead by transmitting, at DL data transmission timing, feedback information informing a channel state.

The above aspects are achieved by providing a method and apparatus for reducing a UL feedback overhead in a wireless communication system.

According to one aspect of the present invention, a resource allocation method for reducing a UL feedback overhead in a wireless communication system is provided. The method includes scheduling DL traffic and determining a transmission period, and allocating UL feedback resources considering the DL traffic transmission period.

According to another aspect of the present invention, a BS operation method for UL feedback allocation in a wireless communication system is provided. The method includes scheduling DL traffic for a plurality of MSs, grouping MSs having the same DL traffic transmission period, and allocating UL feedback resources considering the DL traffic transmission period together with the grouping information.

According to a further aspect of the present invention, a DL scheduling method of a BS for UL feedback allocation in a wireless communication system is provided. The method includes buffering DL traffic and delaying resource allocation, identifying traffic transmission timing for the buffered DL traffic, and requesting for feedback resource allocation at the DL traffic transmission timing.

According to a yet another aspect of the present invention, a BS is provided. The BS includes a DL scheduler and a UL scheduler. The DL scheduler schedules DL traffic and determining a transmission period. The UL scheduler allocates UL feedback resources considering the DL traffic transmission period.

According to still another aspect of the present invention, a BS for UL feedback allocation in a wireless communication system is provided. The BS includes a DL scheduler and a UL scheduler. The DL scheduler schedules DL traffic for a plurality of MSs and groups MSs having the same DL traffic transmission period. The UL scheduler allocates UL feedback resources considering the DL traffic transmission period together with the grouping information.

According to yet still another aspect of the present invention, a BS for UL feedback allocation in a wireless communication system is provided. The BS includes a DL scheduler and a UL scheduler. The DL scheduler buffers DL traffic, delays resource allocation, and identifies traffic transmission timing for the buffered DL traffic. The UL scheduler requests for feedback resource allocation at the DL traffic transmission timing.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE PREFERRED EMBODIMENTS

FIGS. 2 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

A resource allocation method and apparatus for reducing an UL feedback overhead in a wireless communication system according to an exemplary embodiment of the present invention are described below.

Figure 2:
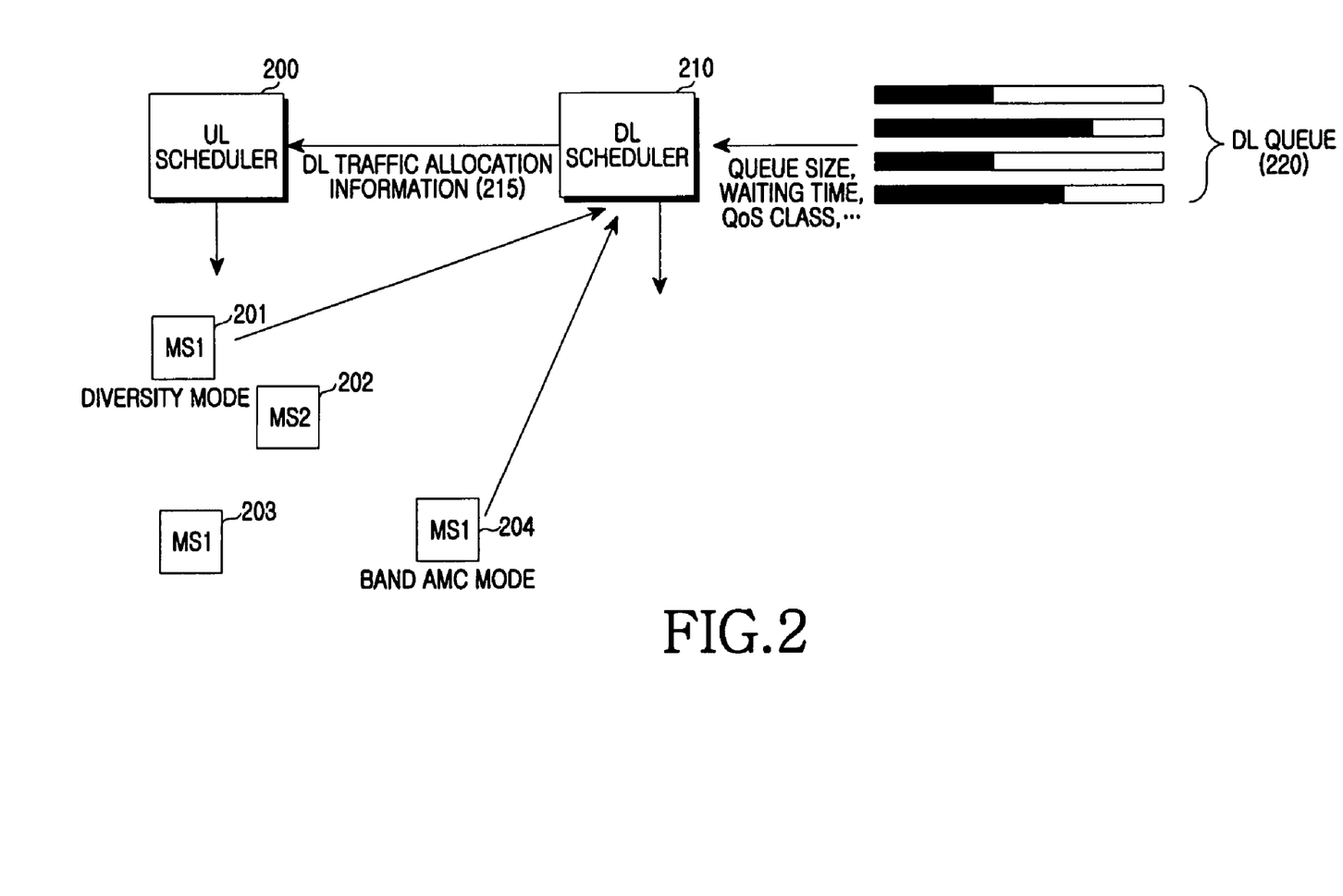
FIG. 2 is a diagram illustrating a scheduling architecture within a base station according to an exemplary embodiment of the present invention.

FIG. 2 is a diagram illustrating a scheduling architecture within a base station according to an exemplary embodiment of the present invention.

Referring to FIG. 2, a UL scheduler 200 receives DL traffic allocation information 215 from a DL scheduler 210. Upon resource allocation for DL traffic 220, the UL scheduler 200 allocates UL feedback resources at corresponding timing. The UL scheduler 200 may change a feedback type, an allocation interval or period, etc. according to a DL channel state of an MS.

Upon resource allocation for DL traffic 220, the DL scheduler 210 receives a feedback of channel state information from each of MSs 201 to 204 at corresponding timing, selects a user MS, and allocates DL resources to the selected MS. The DL scheduler 210 receives a queue size, a waiting time, and QoS class information from a DL traffic queue 220 and selects a user MS according to predefined scheduling algorithm. The data traffics 220 queues according to a service type.

DL scheduling timing may be changed according to the characteristic of the traffics 220 that currently are serviced for the MSs 201 to 204. In the case of fixed period allocation (e.g., Unsolicited Grant Service (UGS) traffic), a UL feedback is allocated using allocation start timing and period information for traffic. If resource allocation timing is changed according to a traffic generation distribution as in the scheduling algorithm (e.g., Proportional Fair (PF), Largest Weighted Delay First (LWDF), Best Effort (BE), etc.), for example, in the case of real time Polling Service (rtPS), extended real time Polling Service (ertPS), non-real time Polling Service (nrtPS), or Best Effort Service (BES)), the UL scheduler 200 allocates a UL feedback resource to an MS in which traffic is generated after receiving DL traffic allocation information 215 from the DL scheduler 210.

For example, the DL scheduler 210 receives channel information from the MSs 101 to 104 and then selects the user MSs 101 and 104 by predefined scheduling algorithm. The user MS 101 operates in a diversity transmission mode, and the user MS 104 operates in a band AMC transmission mode.

Figure 3:
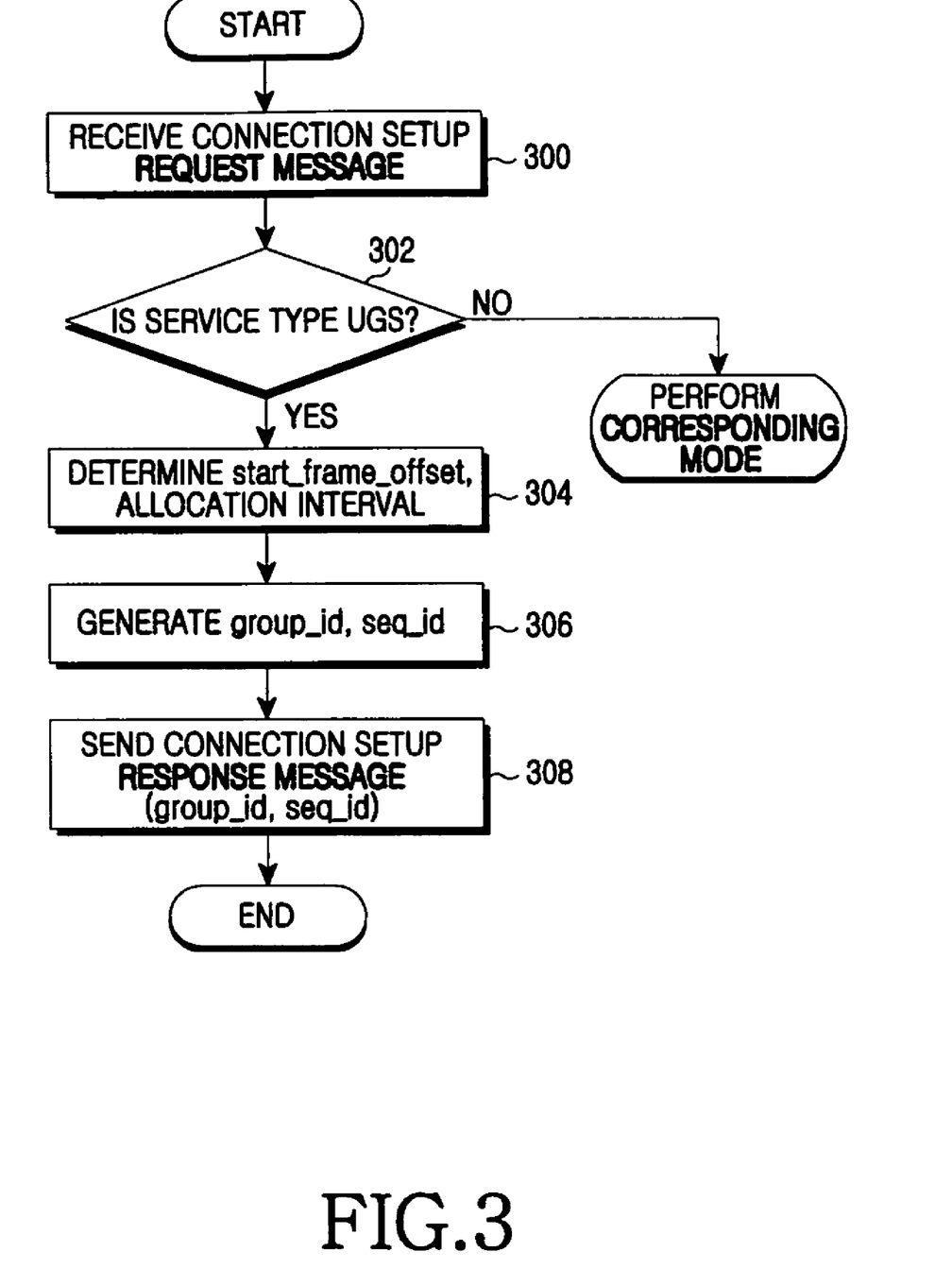
FIG. 3 is a flow diagram illustrating a connection setup process according to an exemplary embodiment of the present invention.

FIG. 3 is a flow diagram illustrating a connection setup process according to an exemplary embodiment of the present invention.

Referring to FIG. 3, in step 300, the BS receives a connection setup request message from a corresponding MS.

Then, in step 302, the BS identifies if a service type is UGS (e.g., a Voice Internet Protocol (VoIP) service). If the service type is the UGS, the BS goes to step 304 and determines a frame offset start point (start_frame_offset) and an allocation interval for allocating feedback resource. If not being the UGS, the BS performs a corresponding mode.

Then, in step 306, the BS groups MSs having the same frame offset start point (start_frame_offset) and feedback allocation interval and generates a group IDentifier (ID) (group_id) and IDs (seq_id) of the MSs within a group. Compared to the conventional art of individually allocating a UL feedback on a per-MS basis, an exemplary embodiment of the present invention proposes a scheme of allocating feedback information on a per-group basis. In the case of UGS, users having the same start offset and allocation period are formed as one group, and resource allocation for the group is indicated.

Then, in step 308, the BS sends a connection setup response message including the group_id and the seq_id.

Then, the BS terminates the connection setup process.

Figure 4:
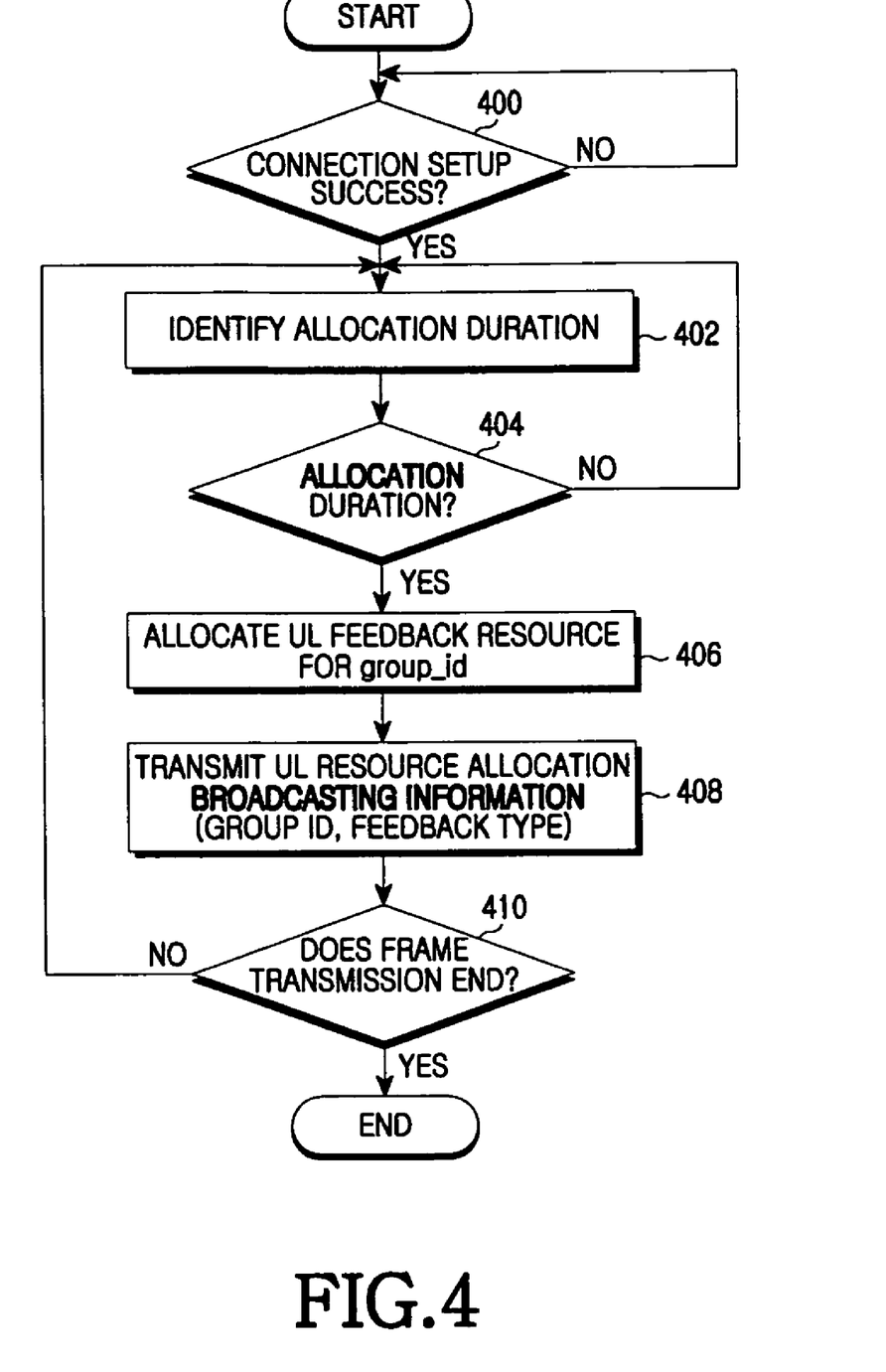
FIG. 4 is a flow diagram illustrating an operation of a base station for uplink feedback allocation according to an exemplary embodiment of the present invention.

FIG. 4 is a flow diagram illustrating an operation of a BS for UL feedback allocation according to an exemplary embodiment of the present invention.

Referring to FIG. 4, if connection setup for a UGS service succeeds in step 400, a BS identifies feedback allocation timing in step 402. The feedback allocation timing follows a UGS traffic allocation period. If the connection setup fails in step 400, the BS repeatedly performs step 400.

Then, in step 404, the BS identifies if it is feedback allocation timing. If it is the feedback allocation timing, the BS goes to step 406 and allocates UL feedback resources for a corresponding group ID. If it is not the feedback allocation timing, the BS returns to step 402.

Then, in step 408, the BS transmits UL resource allocation broadcasting information that includes a group ID (group_id) and a feedback type.

Then, if frame transmission ends in step 410, the BS terminates the feedback allocation process. If the frame transmission does not end in step 410, the BS repeatedly performs steps 402 to 408.

Figure 5:
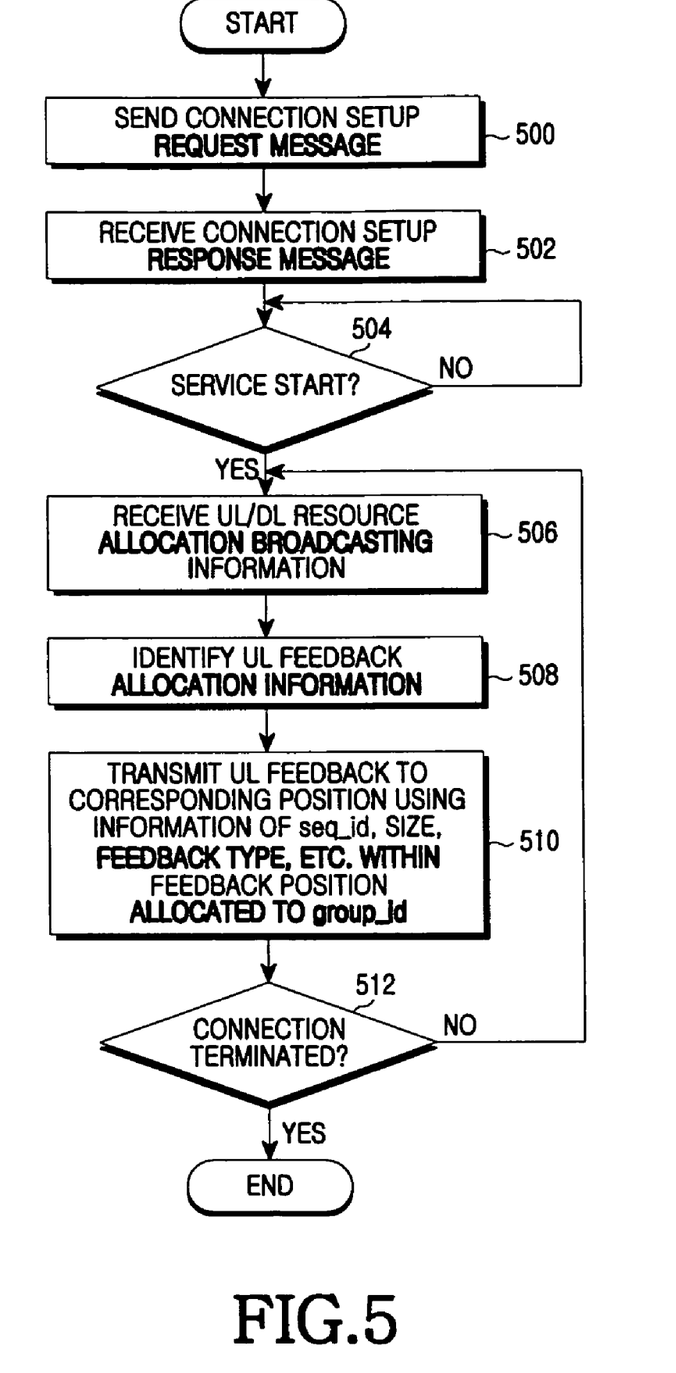
FIG. 5 is a flow diagram illustrating an operation of a mobile station for uplink feedback allocation according to an exemplary embodiment of the present invention.

FIG. 5 is a flow diagram illustrating an operation of an MS for UL feedback allocation according to an exemplary embodiment of the present invention.

Referring to FIG. 5, in step 500, the MS sends a connection setup request message and then, in step 502, receives a connection setup response message.

Then, if there is a service start in step 504, in step 506, the MS receives UL feedback resource allocation broadcasting information, which includes a group ID (group_id), a feedback type, etc., from the BS. If there is no service start in step 504, the MS repeatedly performs step 504.

Then, in step 508, the MS identifies UL feedback allocation information and, in step 510, sends feedback information using information such as a seqid, a size, a feedback type, etc. in a feedback resource region allocated to a group ID (group_id). That is, the MS identifies information on UL feedback allocation through the group_id and seq_id, and transmits feedback information using resources allocated adaptively to a feedback type that is requested to the MS.

Then, in step 512, the MS determines if connection is terminated. If the connection is terminated, the MS terminates the feedback allocation process. If the connection is not terminated, the MS repeatedly performs step 506 to 510.

Figure 6:
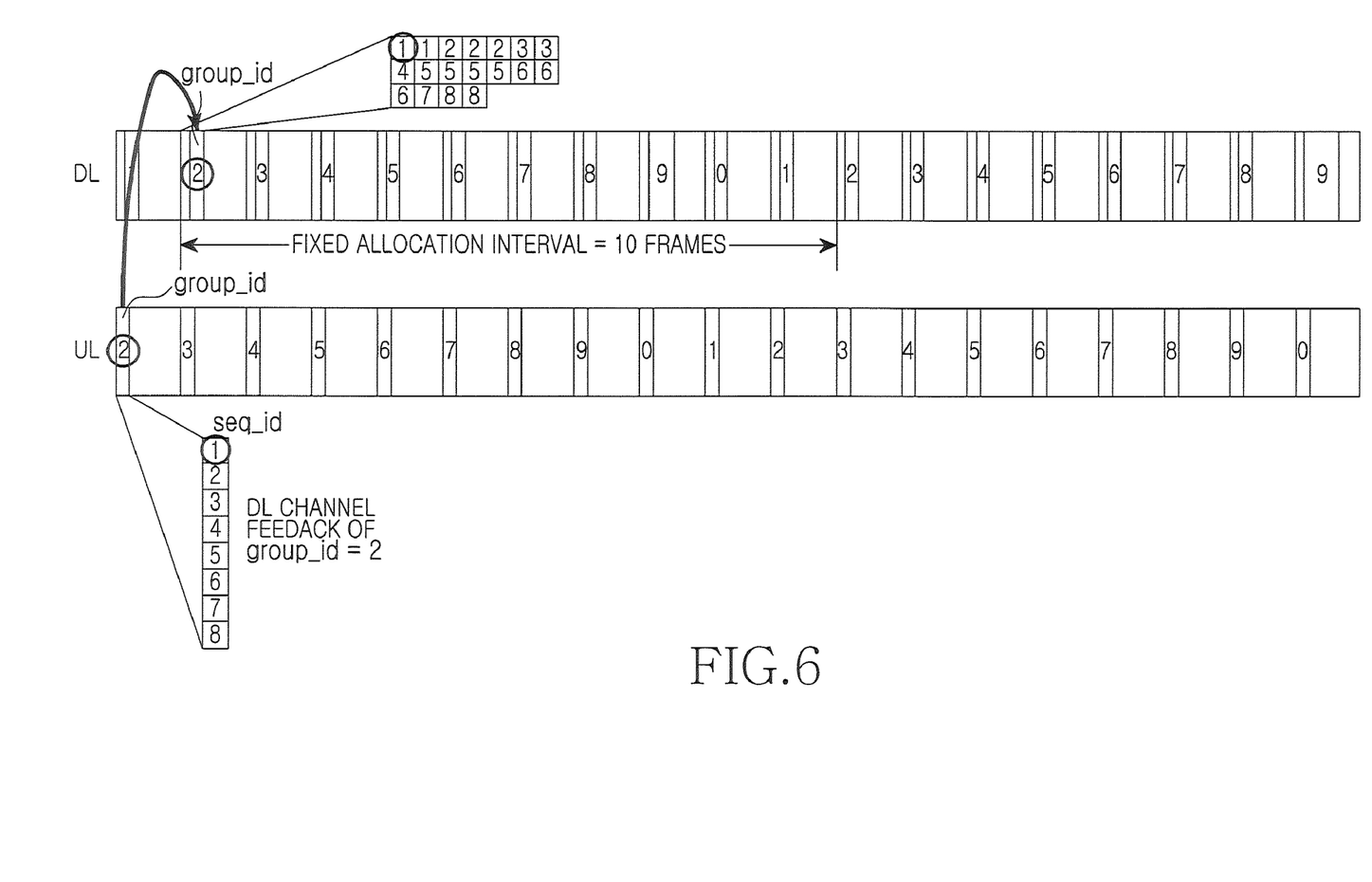
FIG. 6 is a diagram illustrating an example of unsolicited grant service traffic allocation and uplink feedback allocation according to an exemplary embodiment of the present invention.

FIG. 6 is a diagram illustrating an example of UGS traffic allocation and UL feedback allocation according to an exemplary embodiment of the present invention.

Referring to FIG. 6, an MS in a UGS service applies a scheme in which MSs having the same period and start frame offset are formed as single group, are granted identifiers within a group, and are sequentially allocated a feedback (FIGS. 3 to 6). For example, in uplink, eight (8) MSs having the same period and start frame offset are included in group ID2. In downlink, MS1 is allocated two (2) radio resources, MS2 allocated three (3) radio resources, MS3 is allocated two (2) radio resources, MS4 is allocated a single radio resource, MS5 is allocated four (4) radio resources, MS6 is allocated three (3) radio resources, MS7 is allocated a single radio resource, and MS8 is allocated two (2) radio resources.

Figure 7:
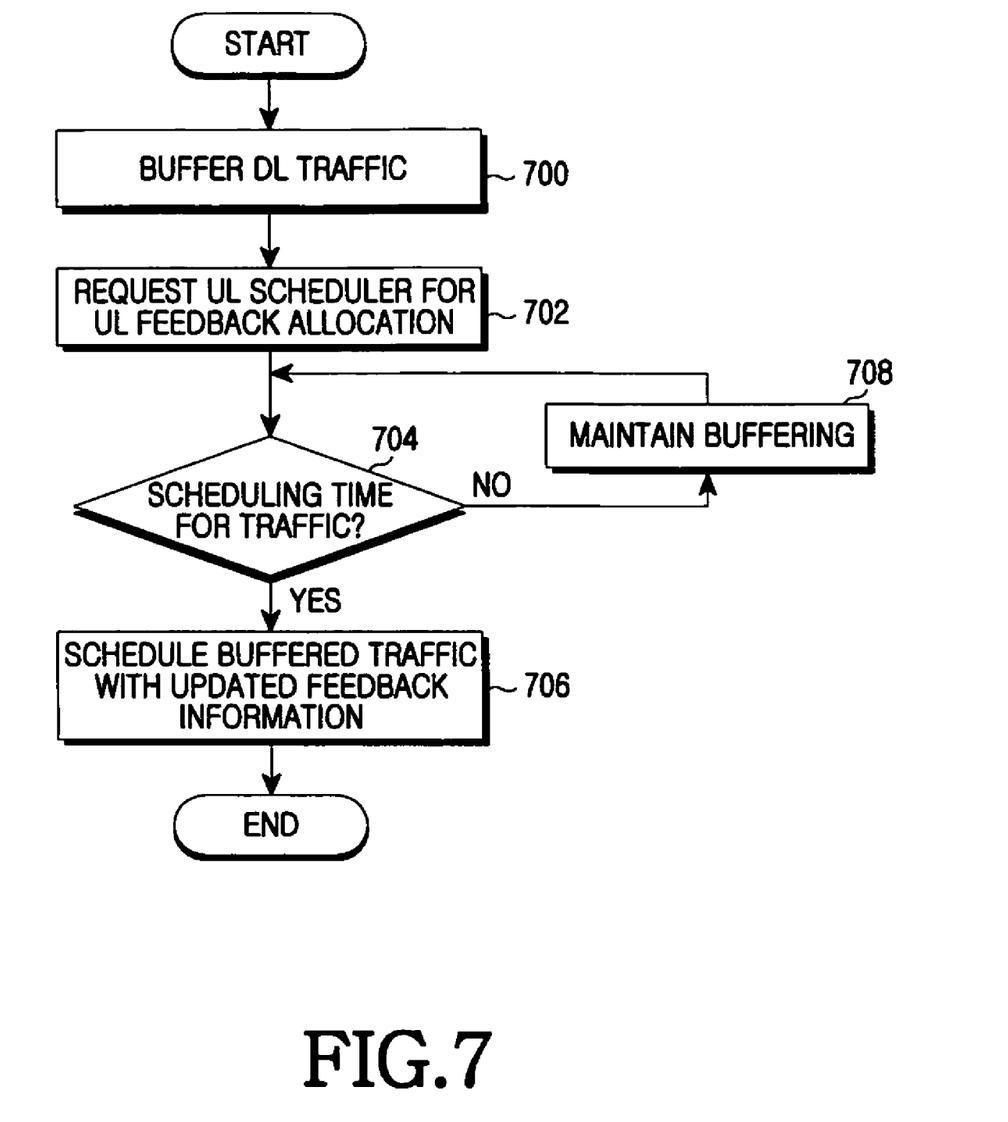
FIG. 7 is a flow diagram illustrating downlink scheduling of a base station for uplink feedback allocation according to an exemplary embodiment of the present invention.

FIG. 7 is a flow diagram illustrating an operation of the DL scheduler of the BS for UL feedback allocation according to an exemplary embodiment of the present invention.

Referring to FIG. 7, in step 700, the DL scheduler buffers DL traffic (e.g., rtPS, ertPS, nrtPS, or BES traffic), thus delaying DL resource allocation for a predetermined duration of time. The DL traffic is non-UGS (e.g., rtPS, nrtPS, BES) traffic and its traffic generation timing cannot be aware and it is difficult to previously make a reservation for resources.

Then, in step 702, the DL scheduler requests a UL scheduler for feedback resource allocation for the buffered traffic. That is, the DL scheduler sends DL traffic allocation information to a UL scheduler. According to realization, if allocating a feedback at the same timing with respect to non-UGS traffic allocation, the DL scheduler together indicates UL feedback allocation information on a user MS having the same feedback type, thereby reducing an overhead of resource allocation information indication.

Then, in step 704, the DL scheduler requests for feedback resource allocation and then identifies a scheduling time for the buffered traffic.

Then, in step 706, the DL scheduler schedules the buffered traffic with updated feedback information at the scheduling time. If it is not the scheduling time, in step 708, the DL scheduler maintains traffic buffering.

Then, the DL scheduler terminates the feedback allocation process.

Figure 8:
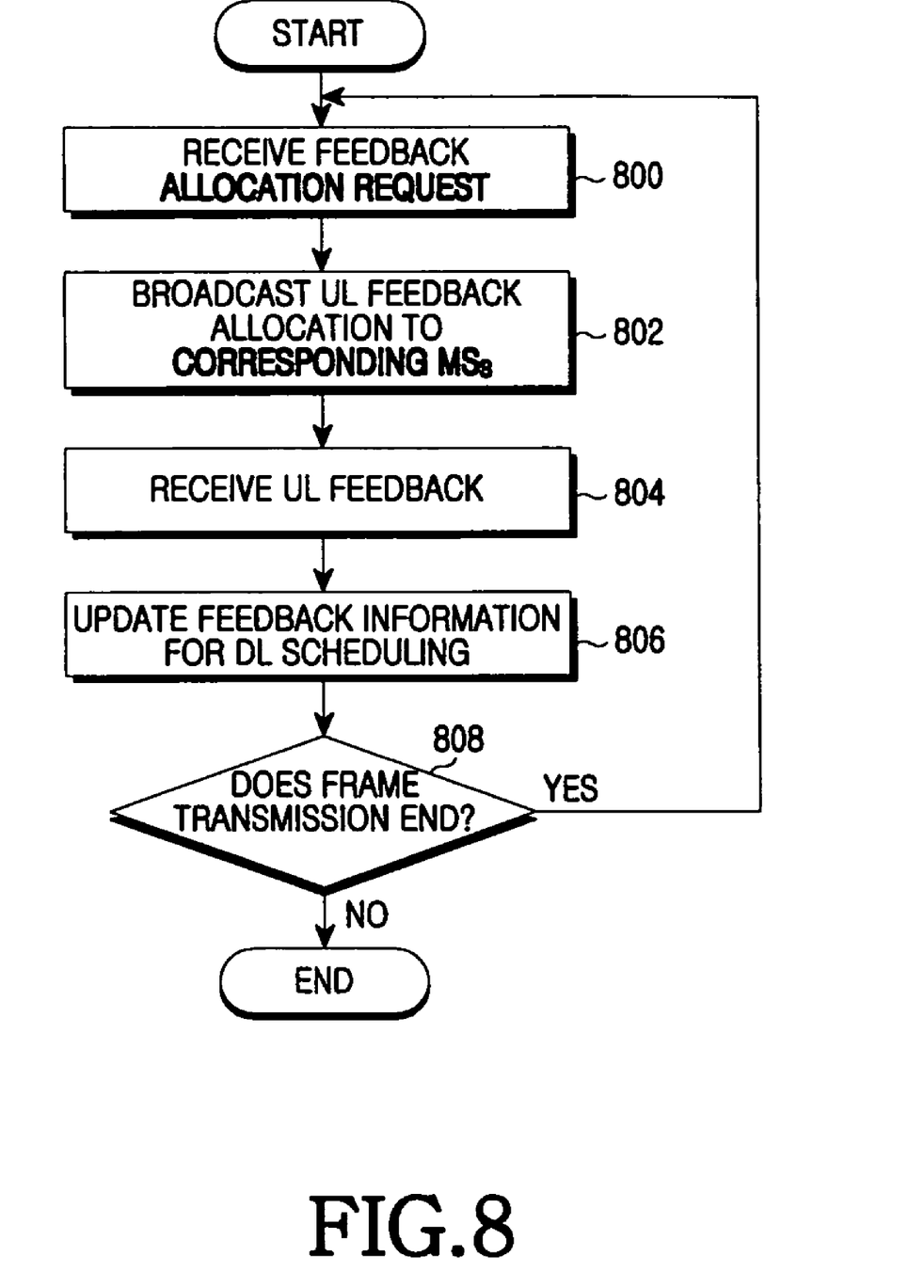
FIG. 8 is a flow diagram illustrating uplink scheduling of a base station for uplink feedback allocation according to an exemplary embodiment of the present invention.

FIG. 8 is a flow diagram illustrating an operation of the UL scheduler of the BS for UL feedback allocation according to an exemplary embodiment of the present invention.

Referring to FIG. 8, in step 800, the UL scheduler receives a feedback allocation request from a DL scheduler and, in step 802, broadcasts UL feedback resource allocation to corresponding MSs.

Then, in step 804, the UL scheduler receives feedback information from the corresponding MSs.

Then, in step 806, the UL scheduler updates feedback information for DL scheduling considering a feedback allocation request of the DL scheduler.

Then, in step 808, the UL scheduler identifies if the frame transmission ends. If the frame transmission ends, the UL scheduler terminates the feedback allocation process. If the frame transmission does not end, the UL scheduler repeatedly performs steps 800 to 806.

Figure 9:
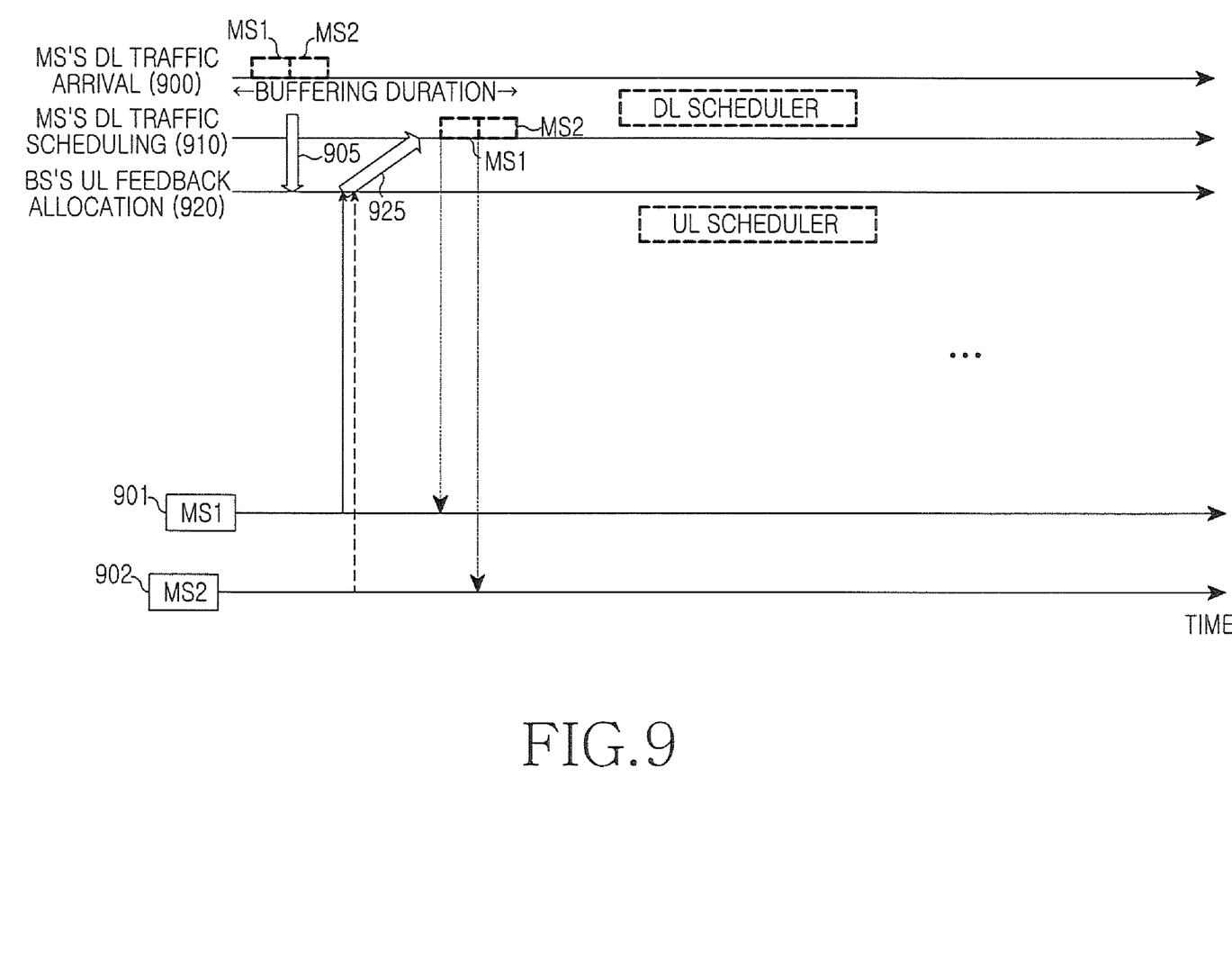
FIG. 9 is a diagram illustrating an example of non-unsolicited grant service traffic allocation and uplink feedback allocation according to an exemplary embodiment of the present invention.

FIG. 9 is a diagram illustrating an example of non-UGS traffic allocation and UL feedback allocation according to an exemplary embodiment of the present invention.

Referring to FIG. 9, because having no transmission periodicity, rtPS, nrtPS, and BES array several MSs' identifiers in a row on a per-feedback-type basis and indicate resource allocation. This causes a lower overhead (FIGS. 7 to 9) as compared to indicating a feedback type, a size, and a position on a per-user basis. For example, a DL scheduler buffers DL traffics (900) for MS1 901 and MS2 902 during a predetermined duration of time. If it is traffic transmission timing, the DL scheduler performs DL traffic scheduling 910 and requests a UL scheduler for feedback resource allocation 905. In response to the request for feedback resource allocation from the DL scheduler, the UL scheduler allocates feedback resources 920 to the MS1 901 and MS2 902. Then, the UL scheduler receives feedback information from the MS1 901 and MS2 902, and transmits the feedback information to the DL scheduler 925.

As described above, an exemplary embodiment of the present invention has an advantage of reducing a UL feedback overhead by performing UL feedback allocation to a DL resource allocation time in a wireless communication system.

Also, an exemplary embodiment of the present invention can reduce an overhead by, upon UL feedback allocation, performing simultaneous allocation to a group or several user MSs in a conventional method of allocation by user MSs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A resource allocation method for reducing an uplink feedback overhead in a wireless communication system, the method comprising:
scheduling downlink traffic and determining a downlink traffic transmission period; and
allocating uplink feedback resources considering the downlink traffic transmission period,
wherein a period for the uplink feedback transmission is based on the downlink traffic transmission period, and
wherein information on the uplink feedback comprises channel state information.

2. The method of claim 1, wherein the period for the uplink feedback transmission is equal to the downlink traffic transmission period, and the uplink feedback transmission is performed before downlink traffic transmission.

3. The method of claim 1, further comprising performing service connection for downlink traffic transmission.

4. A base station operation method for uplink feedback allocation in a wireless communication system, the method comprising:
scheduling downlink traffic for a plurality of mobile stations;
grouping mobile stations having the same downlink traffic transmission period; and
allocating uplink feedback resources considering the downlink traffic transmission period together with the grouping information,
wherein a period for the uplink feedback transmission is based on the downlink traffic transmission period, and
wherein information on the uplink feedback comprises channel state information.

5. The method of claim 4, wherein the downlink traffic is unsolicited grant service traffic.

6. A downlink scheduling method of a base station for uplink feedback allocation in a wireless communication system, the method comprising:
buffering downlink traffic and delaying resource allocation;
identifying traffic transmission timing for the buffered downlink traffic; and
allocating for uplink feedback resource at the downlink traffic transmission timing,
wherein information on the uplink feedback comprises channel state information.

7. The method of claim 6, wherein the downlink traffic is one of a real time polling service, extended real time polling service, non-real time polling service, and best effort service.

8. The method of claim 6, further comprising updating feedback information considering the traffic transmission timing.

9. A base station comprising:
a downlink scheduler for scheduling downlink traffic and determining a downlink transmission period; and
an uplink scheduler for allocating uplink feedback resources considering the downlink traffic transmission period,
wherein a period for the uplink feedback transmission is based on the downlink traffic transmission period, and
wherein information on the uplink feedback comprises channel state information.

10. The base station of claim 9, wherein a period for the uplink feedback transmission is equal to the downlink traffic transmission period, and the uplink feedback transmission is performed before downlink traffic transmission.

11. The base station of claim 9, wherein the base station is configured to perform service connection for downlink traffic transmission.

12. A base station for uplink feedback allocation in a wireless communication system, the base station comprising:
a downlink scheduler for scheduling downlink traffic for a plurality of mobile stations and grouping a number of the plurality of mobile stations having the same downlink traffic transmission period; and
a uplink scheduler for allocating uplink feedback resources considering the downlink traffic transmission period together with the grouping information,
wherein a period for the uplink feedback transmission is based on the downlink traffic transmission period, and
wherein information on the uplink feedback comprises channel state information.

13. The base station of claim 12, wherein the downlink traffic is unsolicited grant service traffic.

14. A base station for uplink feedback allocation in a wireless communication system, the base station comprising:
a downlink scheduler for buffering downlink traffic, delaying resource allocation, and identifying traffic transmission timing for the buffered downlink traffic; and
a uplink scheduler for allocating feedback resources at the downlink traffic transmission timing,
wherein information on the uplink feedback comprises channel state information.

15. The base station of claim 14, wherein the downlink traffic is one of a real time polling service, extended real time polling service, non-real time polling service, and best effort service.

16. The base station of claim 14, wherein the uplink scheduler updates feedback information considering the traffic transmission timing.

17. A wireless communications network comprising a plurality of base stations, wherein each of the plurality of base stations comprising:
a downlink scheduler for scheduling a downlink traffic and determining a downlink transmission period; and
an uplink scheduler for allocating uplink feedback resources considering the downlink traffic transmission period,
wherein a period for the uplink feedback transmission is based on the downlink traffic transmission period, and
wherein information on the uplink feedback comprises channel state information.

18. The network of claim 17, wherein the period for the uplink feedback transmission is equal to the downlink traffic transmission period, and the uplink feedback transmission is performed before downlink traffic transmission.

19. The network of claim 17, wherein at least one of the base stations is configured to perform service connection for downlink traffic transmission.

20. The network of claim 17, wherein the downlink traffic is one of a real time polling service, extended real time polling service, non-real time polling service, and best effort service.

* * * * *